United States Patent [19]

Hawkes

[11] Patent Number: 4,733,895

[45] Date of Patent: Mar. 29, 1988

[54] ELECTROMECHANICAL MANIPULATOR ASSEMBLY

[75] Inventor: Graham S. Hawkes, Oakland, Calif.

[73] Assignee: Deep Ocean Engineering Incorporated, Oakland, Calif.

[21] Appl. No.: 847,695

[22] Filed: Apr. 3, 1986

Related U.S. Application Data

[62] Division of Ser. No. 466,606, Feb. 15, 1983, Pat. No. 4,607,998.

[51] Int. Cl.$^4$ .............................................. B66C 1/44
[52] U.S. Cl. ...................................... 294/88; 294/66.1
[58] Field of Search ................. 414/4, 735, 738, 739; 901/37; 294/88, 66.1

[56] References Cited

U.S. PATENT DOCUMENTS

| | | | |
|---|---|---|---|
| 2,956,834 | 10/1960 | Embree | 414/739 |
| 3,804,452 | 4/1974 | David et al. | 294/88 |
| 4,350,381 | 9/1982 | Hellmann | 294/88 |
| 4,452,479 | 6/1984 | Terai et al. | 294/88 |

Primary Examiner—Leslie J. Paperner
Assistant Examiner—Donald W. Underwood
Attorney, Agent, or Firm—Flehr, Hohbach, Test, Albritton & Herbert

[57] ABSTRACT

A powered, electromechanical manipulator assembly is disclosed which includes an electrically powered input device coupled by a hydraulic circuit to a mechanical manipulator. The hydraulic circuit is a fixed-volume, closed circuit in which a master piston-cylinder assembly is driven by a D.C. motor and is hydraulically coupled for direct and proportional displacement of a slave piston-cylinder assembly to enable smooth, accurate and easily controlled displacement of a manipulator arm. The manipulator arm is formed of a plurality of modules each having a fixed-volume, closed, hydraulic circuit and a slave cylinder. Both the slave and master cylinders include ambient pressure surfaces which are exposed to the water pressure at the operating depth of the assembly so that variation in depth does not materially affect the response or dexterity of the remote manipulator apparatus. An improved terminal module or jaw assembly is also disclosed.

5 Claims, 4 Drawing Figures

ELECTROMECHANICAL MANIPULATOR ASSEMBLY

This is a division of application Ser. No. 466,606, filed Feb. 15, 1983, now U.S. Pat. No. 4,607,998.

BACKGROUND OF THE INVENTION

The present invention relates, in general, to remotely-operated, manipulative devices and relates, more particularly, to underwater or sub-sea, remotely-controlled, powered manipulator arms.

In recent years the use of manned and unmanned underwater aparatus to explore and develop natural resources has increased dramatically. In the petroleum industry, for example, off-shore drilling has required both manned apparatus (submersibles) and unmanned underwater apparatus (robotic devices) which are capable of performing a wide variety of manipulative tasks. Typically such apparatus includes one or more remotely operated, powered arms which have a terminal device, such as claws, pincers or jaws, which are analogous to a human hand. The manipulator arms are usually jointed or have several axes of movement and may be controlled in a pre-programmed manner or by a remotely-operated input device. Such manipulator assemblies are exposed to very adverse environmental conditions, particularly when operated in bodies of salt water at substantial depths, which is the normal operating environment for most off-shore oil exploration and recovery equipment.

Prior underwater, electromechanical manipulator apparatus have typically employed a D.C. motor coupled to a hydraulic pump as the primary power for actuation or moving of the arm assemblies. The hydraulic pumps are coupled to a hydraulic circuit employing solenoid valves to control displacement of the manipulator arms and operation of the claws or jaws on the end of the arms.

If these prior art solenoid-based manipulator systems are relatively simple, the operating characteristics have been found to be poor. The smoothness and dexterity of movement with which the arm and claws can be manipulated are not satisfactory for many applications. In order to attempt to have a smoothly operating solenoid valve-based system, the valving and pump controls can be made very complex, but the resulting complexity substantially increases cost and the incidence of breakdown.

Another prior art approach to underwater manipulative assemblies is to employ a D.C. motor-feedback servo amplifier system in which the motor directly drives the mechanical elements in the arm. Such a direct coupling of the D.C. motor to the mechanical manipulator elements has been found to require extremely close tolerances with attendant undesirable cost. Moreover, there are substantial shock-loading problems in the gearboxes of such systems.

A remotely operated, underwater manipulator assembly should be capable of smooth motion over a wide speed range. Thus it should be able to move uniformly and smoothly at low speeds for precise work and smoothly at high speeds for rapid arm positioning. Underwater manipulator assemblies also should be able to exert a variable force at any of the speeds in its range of operating speeds. Moreover, a remotely operated underwater manipulator arm or assembly should have the capability of simultaneous and cooperative motion in two or more directions to give full freedom of movement of the terminal device or gripping jaws. The combination of smooth functioning over a wide spreed range, variable force throughout the range, and multidirectional movement provides an underwater manipulator arm assembly which begins to closely approximate the motion and dexterity of a human arm and hand.

OBJECTS OF THE INVENTION

Accordingly, it is an object of the present invention to provide an electromechanical manipulator assembly for a powered underwater apparatus which has greatly improved dexterity and precision of operation.

Another object of the present invention is to provide an electromechanical manipulator assembly which can be used on submersibles or robotic devices and is capable of operation through a wide range of operating speeds in which the arm moves smoothly and without stepping, jerking or discontinuous motion.

A further object of the present invention is to provide an electro-mechanical manipulator assembly for an underwater device in which control of the motion of the manipulator arm and terminal device are greatly simplified and made more reliable.

Still a further object of the present invention is to provide an electromechanical manipulator assembly for an underwater in which improved control is provided with respect to the force which can be applied through the manipulator arm assembly to a workpiece or object being worked upon.

Another object of the present invention is to provide an improved hydraulic cylinder for use in a hydraulic circuit to produce controlled displacement of a remote electromechanical underwater manipulator assembly.

Still a further object of the present invention is to provide a jaw or claw assembly for a remote manipulator apparatus having improved capability for gripping objects and manipulating the same.

Another object of the present invention is to provide an arm assembly for mounting to and use in an underwater manipulator apparatus which is composed of modular units each having a displacement function, that can be coupled together to provide a multifunction arm having greatly improved manipulative capabilities.

The electromechanical underwater manipulator assembly of the present invention has other objects and features of advantage which will be set forth in and become apparent from the following description of the preferred embodiment and the accompanying drawing.

SUMMARY OF THE INVENTION

The electromechanical manipulator assembly of the present invention includes an electrically powered input means coupled by hydraulic circuit means to a mechanical manipulator arm. The improvement of the present invention is comprised, briefly, of the hydraulic circuit including a master piston-cylinder connected for input from the input means and directly hydraulically coupled by a fixed-volume, closed, hydraulic circuit to a slave piston-cylinder assembly for direct and proportional displacement of the slave piston-cylinder assembly, which in turn is coupled to the manipulator arm for displacement thereof. The interposition of a fixed-volume, closed hydraulic circuit between the manipulator arm and a D.C. motor which is controlled by a servo-amplifier input device produces smooth, continuous and easily controlled arm displacements and force variation.

In another aspect of the present invention, the hydraulic circuit includes a master piston-cylinder assembly and a slave piston-cylinder assembly which are both exposed to ambient water pressure so as to make operation of the hydraulic portion of the electromechanical manipulator assembly relatively insensitive to the depth of operation of the apparatus. In a further aspect of the present invention, the arm assembly includes a plurality of arm portions each formed as modules having end couplings formed for mounting to similarly formed end couplings on other modules and intermediate displacement means formed to produce relative displacement within each of the modules. This modular construction allows a plurality of functions to be coupled together to greatly enhance the manipulative capabilities of the arm assembly.

Finally, the electromechanical manipulator assembly of the present invention preferably includes a jaw assembly in which movable jaw elements are formed with tips or distal ends that can be moved or are articulated so as to grip around and clamp down upon a workpiece with a substantial uniform and even gripping force.

DESCRIPTION OF THE DRAWING

FIG. 4 is an enlarged end elevational view of the module coupling sleeve shown in FIG. 2.

DESCRIPTION OF THE PREFERRED EMBODIMENT

Figure 1:
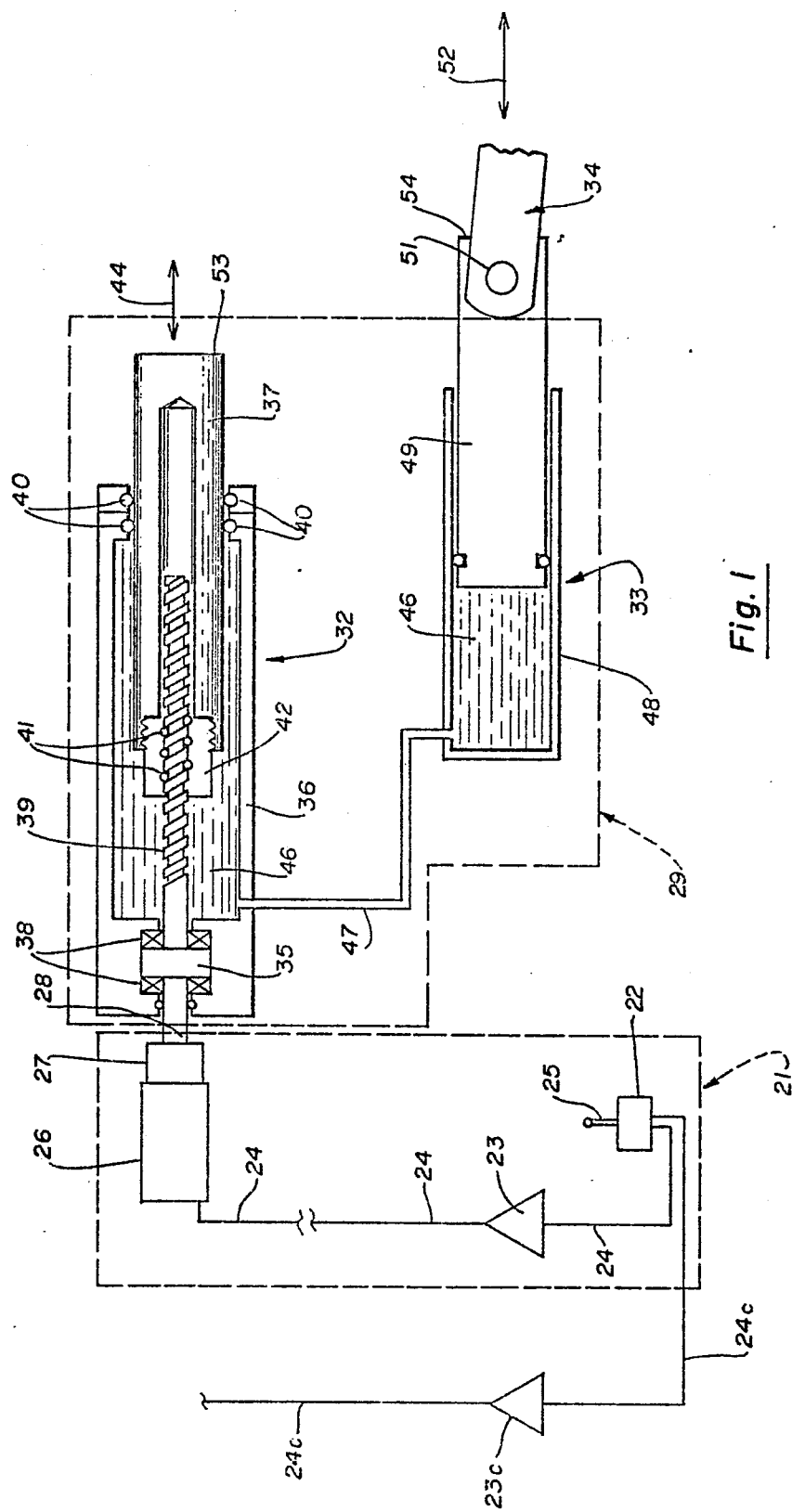
FIG. 1 is a schematic representation of an electromechanical manipulator assembly constructed in accordance with the present invention.

The basic elements of the electromechanical manipulator assembly of the present invention for achieving a single function or type of movement can be seen in FIG. 1. As will become apparent hereinafter, the basic elements of FIG. 1 can be duplicated and added together to produce electromechanical arms capable of extremely complex movements.

Referring to FIG. 1, the electromechanical manipulator assembly can be seen to include input means, generally designated 21, preferably comprised of a manually operable, X-Y input controller 22 electrically coupled to motor control operation amplifier 23, which in turn is connected by conductor 24 to D.C. motor 26. Direct coupling of the electrical motor to a manipulator arm presents substantial shock loading and gearbox design problems. Accordingly, extending from a gearbox 27 driven by motor 26 is an output shaft 28 to a hydraulic circuit, generally designated 29.

As used in the remote manipulator assembly of the present invention, the X-Y input device 2 (preferably with a joy stick that is not displaceable) and operation amplifier 23 are located at the position of the user or operator, while motor 26, gearbox 27, shaft 28 and hydraulic circuit 29 are mounted at the manipulator arm. If the apparatus of the present invention is used in a manned submersible, the distance between the operator and the arm is not great, but when the device of the present invention is used in an unmanned, robotic system, the operator, X-Y controller and operation amplifier are typically located at the surface, while the D.C. motor and hydraulic circuit are submerged, as much as several hundred feet. Electrical connector means 24, accordingly, may vary from between 10 to 1000 feet in length.

It is broadly known in the electromechanical manipulator assembly art to employ an electrical input means, such as controller 22 and D.C. motor 26, in combination with a hydraulic circuit 29 in order to effect displacement of a manipulator arm. Such prior art systems typically employ complex hydraulic valve arrangements and a fluid pump driven by the D.C. motor. In the improved manipulator assembly of the present invention, however, hydraulic circuit means 29 includes a master piston-cylinder assembly, generally designated 32, connected for input from input shaft 28 and directly hydraulically coupled by a fixed-volume, closed, hydraulic circuit to a slave piston-cylinder assembly, generally designated 33. Such fixed-volume coupling produces direct and proportional displacement of the slave assembly and a mechanical manipulator means, schematically shown as a piston connecting rod generally designated 34, coupled to slave assembly 33.

It is preferable that master piston-cylinder assembly 32 include a cylinder 36 in which piston 37 is movably mounted. Movement of piston 37 may be accomplished by coupling drive shaft 28 through thrust bearings 38 to a screw 39 which extends into a ball-type of follower assembly 41 carried by sleevr 42 threadably mounted to piston 37. The piston 37 is formed with an axial bore 43 dimensioned for receipt of screw shaft 39 as the piston is reciprocated, as indicated by arrows 44.

Reciprocation of piston 37 in master cylinder 36 produces displacement of hydraulic fluid 46 into and out of conduit 47, which is coupled to slave cylinder 48. Reciprocally mounted in slave cylinder 48 is slave piston 49 to which a manipulator arm element 34 can be secured, for example by pivotal mounting pin 51. The combined volume of cylinders 36, 48 and of conduit 47 is fixed and closed. Displacement of the master piston, therefore, produces a directly proportional displacement of slave piston 49, as indicated by arrows 52.

Rather than enclosing both the master and slave piston-cylinder assemblies so as to isolate the same from the ambient water pressure in which the manipulator arm is operating, it is an important feature of the present invention that both master piston-cylider assembly 32 and slave piston-cylinder assembly 33 be formed with surfaces that are positioned for and exposed to the ambient water pressure in which the manipulator assembly is operating. Thus, end surface 53 of piston 37 and end surface 54 of piston 49 are exposed to the water pressure at the depth at which the manipulator arm is being employed. Thus, there is no pressure differential between the master and slave which must be overcome, as would be the case if, for example, the master cylinder was enclosed. Under no-load conditions, moreover, slave piston 49 is free to move in cylinder 48, and the ambient water pressure acting on surface 54 of the slave piston will drive the piston inwardly until the pressure on the hydraulic fluid 46 inside the closed system is substantially equal to the pressure of the surrounding body of water at the depth of the manipulator arm.

This equilibrium relationship between the hydraulic fluid pressure and the ambient water pressure results in a substantially constant relationship between the torque on motor 26 and the force applied to manipulator arm element 34, regardless of the depth of operation (below a certain minimum depth) of the manipulator arm.

Additionally, exposing surfaces 53 and 54 to the ambient water pressure affords a return mechanism which is very positive in control of the master and slave piston-cylinder assemblies. As master cylinder 37 is pulled inwardly toward motor 26 by rotation of shaft 28, fluid 46 will be forced from cylinder 36 through conduit 47 to cylinder 48. This in turn will result in outward displacement of piston 49. When the master piston 37 is moved outwardly away from motor 26 by shaft 28, the water pressure on surface 54 of slave piston 49 immediately pushes the slave piston and arm element 34 inwardly to produce a very positive stroke relationship between the master piston and arm element 34.

As the operating depth at which the hydraulic circuit is positioned decreases, the pressure on surface 54 tending to return the slave cylinder is reduced. It has been found, however, that even when the apparatus of the present invention is operated above water so that the pressure on surface 54 is only 14.7 lbs. psi, the slave piston will follow the master piston quite positively and accurately. Thus, the electromechanical manipulator assembly of the present invention can be readily controlled even at very minimum depths. Since much of the under-sea use of remote manipulator systems is at depths well below 200 feet, for example, for 600 to 1000 feet, the closed, fixed volume hydraulic circuit of FIG. 1 is extremely positive and relatively depth insensitive in its operation.

It is a further important feature of the present invention that the manipulator assembly be formed in a manner which prevents driving of motor 26 in the reverse direction under loading of the manipulator arm. Thus, a load on are element 34 should not be capable of overcoming the motor, and preferably should not even load the motor.

In the apparatus of the present invention reverse operation is prevented by forming the thrust bearing assembly, comprised of shaft mounted thrust member 35 and bearings 38, with sufficient friction to prevent reverse operation. The area of member 35 mounted for rotation with shaft 28 and the coefficient of friction with bearings 38 have been selected so that the friction force in the bearings is always slightly greater than the torque that can be generated in the ball-screw assembly by loading arm 34.

An inward force on arm 34 will pressurize fluid 46 in the master cylinder tending to urge master piston 37 outwardly. The outward force on piston 37 applies a torque to screw element 39, but also pulls shaft 28 outwardly and urges thrust element 35 against bearings 38. The friction between thrust element 35 and bearings 38 will be slightly greater that the torque on shaft 28 and rotation of the shaft prevented. As the load on arm 34 increases, the torque increases on shaft 28, but the friction force increases just as fast and always remains slightly higher than the torque. The result is that thrust bearings 38 lock up the system against reverse running. This action occurs regardless of the direction of axial displacement and prevents reverse running whether the load on element 34 is positive or negative.

In order to drive the assembly with motor 26, however, the motor must also overcome the friction force in bearings 38. Thus, motor-gearbox assembly is selected to have sufficient torque output not only to produce the force required at arm 34, but to overcome the friction in thrust bearings 38 at maximum load. Using teflon thrust bearings, slightly more than one-half of the output is required to overcome the thrust bearing, but this requirement can be easily met with appropriate motor and gearbox selection.

A further significant feature of the master ball-screw assembly is that the rotation of piston 37 is prevented by the friction of O-rings 40 against piston 37. Thus, rotation of screw 39 is converted into axial displacement of piston 37 only if the piston is secured against rotation. This can be done by keying the piston, but it is advantageously accomplished by O-rings 40 which frictionally engage the piston. Moreover, the pressure of fluid 46 on the innermost O-rings 40 causes the frictional force to increase with loading. As the tendency of piston 37 to rotate increases, therefore, the friction force of O-rings 40 also increases.

The assembly of the present invention, therefore, includes a load-responsive, reverse-operation blocking system and a load-responsive, piston rotation stabilizing system.

The hydraulic circuit of the present invention produces linear displacement of piston 37 which is positively and directly controlled in a fixed relationship to the torque of motor 26. It is possible, therefore, to employ sensing means (not shown) which feeds back to the operator or user a signal indicating the torque and the speed of motor 26. Such feedback can then be used by the manipulator operator to give input to X-Y input device 22 and thereby more accurately and positively control displacement of manipulator element 34. The feedback system is based on the ability to positively and substantially linearly relate torque and speed of motor 26 to displacement of master piston 37.

The feedback system suitable for use with the electromechanical manipulator assembly of the present invention is more fully set forth in my co-pending patent application entitled, "Apparatus and Method for Providing useful Audio Feedback to Aid in the Operation of Remotely controlled Powered Manipulators".

Since hydraulic circuit 29 is a closed and a fixed-volume circuit, the speed of movement of slave piston 49 and the value or quantity of force and direction of movement are all also positively and directly controlled by electric motor 26. Therefore, even allowing for slight non-linear electrical and mechanical characteristics of the drive motor and a friction loss of about one-half in the thrust bearings, the input current to motor 26 is directly porportional to the force exerted on the workpiece by manipulator element 34. Similarly, the input voltage (after taking into account the torque component of applied voltage) is directly proportional to the speed of movement of the manipulator arm 34.

With the electromechanical manipulator assembly of the present invention, therefore, it is possible to get very smooth and continuous controlled movements ranging in speed and force from 0 to a maximum speed and force, all without steps, discontinuities, or jerking or shuttering motion. Moreover, the electromechanical system of the present invention is very simple and relatively troublefree in its operation. It does not require complicated solenoid valving, continuously operating pumps, large or complicated gearboxes or elaborate control and sensing feedback apparatus.

As thus far described, the electromechanical manipulator assembly is constructed to perform one function, for example, displacement of arm 34 in a position or negative direction along the X axis, as indicated by arrows 52. In order to provide a manipulator arm capable of complex displacements, it is preferable that arm assembly, generally designated 61 and shown in FIG. 2, be composed of a plurality of modules, generally designated 62a, 62b, 62c and 62d, each capable of performing at least one manipulative function. If, for example, arm element 34b is coupled by pin 63 to element 64 of module 62b, and element 66 in which slave cylinder 48b and piston 49b are mounted is pivoted at pin 67 to element 64, displacement of slave piston 49b to the right will cause pivoting of the arm assembly upwardly, while displacement to the left will cause pivoting of the arm assembly downwardly. Displacement in one direction is limited by the bottom of the cylinder, and displacement in the other direction is limited by transverse stops or pins 70 projecting inwardly from the cylinder walls so as to engage the piston.

If the next module 62c is oriented at 90° to assembly 62b, displacement of the slave piston 49c in cylinder 48c to the left will produce pivoting about pin 65 of the arm assembly outwardly of the sheet, while displacement of piston 49c and arm 34c to the right will cause a pivoting of the arm assembly inwardly from the sheet. The combination of modules 62b and 62c, therefore, will produce displacement in both the X and Y directions. Module 62b and 62c are coupled through conduits 47b and 47c to similarly formed hydraulic circuits and motors as described in connection with FIG. 1. Both D.C. motors are electrically coupled to a common X-Y input device 22 (as shown in FIG. 1 by connector 24c and operation amplifier 23c). This construction will enable simultaneous X-Y movements of manipulator arm assembly 61 by manual input to the input joy stick or lever 25 of input device 22.

In addition to providing for linear movement, it is also possible to form one or more of the arm modules for rotational movement. For example, module 62c can advantageously be formed for rotational movement. Displacement from the fixed volume hydraulic circuit can be communicated through conduit 47d to module 62d from a master piston cylinder assembly. The slave piston cylinder assembly in module 62d includes a ball-screw assembly which essentially operates in reverse as compared to master ball-screw assembly 32. This ball-screw assembly is described in more detail hereinafter, but it will cause rotational movement of the terminal body 69 with respect to collar 71. Usually such units are constructed so that rotational movement in a positive direction of about 110° can be achieved and in a negative direction of about 110°. Greater or lesser rotation can be built into module 62d, as may be required by the application to which the manipulator is put.

Each of the arm modules 62a, 62b, 62c and 62d are formed with first ends, such as end 81a formed for mechanical coupling to a matingly-formed member. Each of the modules (except 62d) further has a second end, such as end 82b, similarly formed for mechanical coupling to a matingly-formed member. In the assembly of the present invention, first end 81a is formed for mating coupling to second end 82b in each of the various modules by threaded collar 86 shown in FIG. 4.

In order to enable securement of the modules in any desired angular orientation with respect to each other, the ends are locked in place by a split collar or sleeve 86 which can be cinched down to lock the modules in place by a plurality of bolts 87. Bolts 87 pass through threaded longitudinally extending rods 83 and 84 mounted to sleeve 86 by flanges 88 which define slots 89 in which the bolts are positioned.

Figure 3:
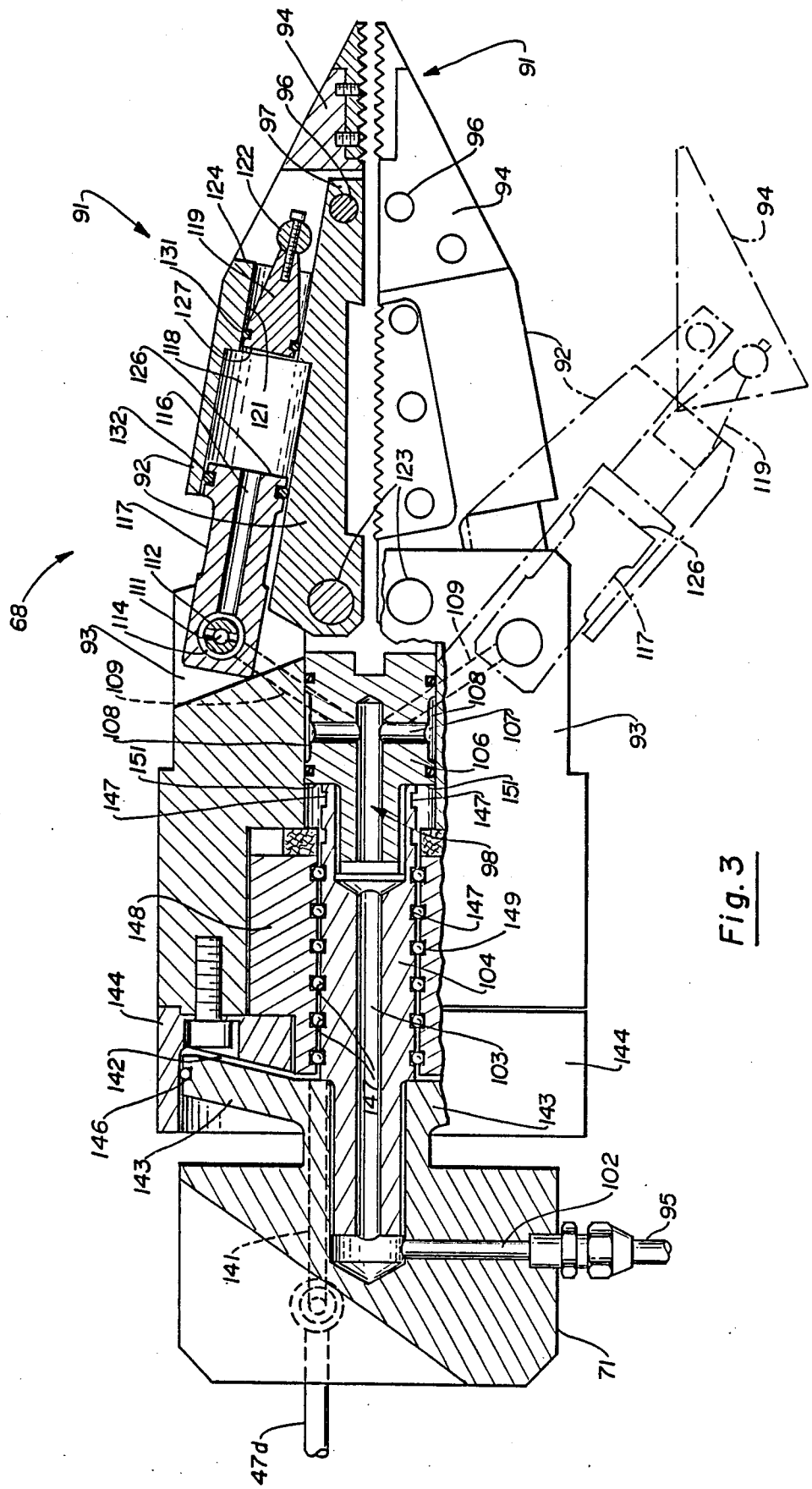
FIG. 3 is an enlarged, side-elevational view, partially broken away and in cross section, showing a jaw assembly or terminal device constructed in accordance with the present invention.

The remote electromechanical manipulator assembly of the present invention further preferably includes an improved terminal device or jaw means 68, which can best be seen in FIG. 3. The jaw assembly includes a pair of opposed jaw means, generally designated 91, formed for gripping of objects or workpieces. At least one of jaw means 91 is movably mounted with respect to the remainder of the jaw means, and drive means, in this case a hydraulic circuit, is coupled through conduit 95 to displace the moveable one of the jaw means. In the improved manipulator apparatus, the moveable one of jaw means 91 is formed to include a base member or element 92 movably mounted with respect to body portion 93 of the jaw assembly and a tip member 94 pivotally mounted about pivot pin 96 to the distal end 97 of base member 92. The hydraulic drive circuit, generally designated 98, is formed and connected to pivotally displace tip 94 toward the other jaw independently of displacement base member 92 toward the other jaw.

This construction enables the articulated tips 94 to close down around the back side of an object. The claw or jaw assembly of the present invention, therefore, can be used to grip pipes and other round objects with the tips 94 articulating down around the back side of the pipe.

Operation of the jaw assembly so as to cause independent pivoting of the jaw tips can best be understood by a more detailed description of hydraulic circuit 98. Conduit 95 is coupled at jaw assembly collar or cuff element 71 to supply hydraulic fluid to a conduit or passageway 102 therein. Mounted in communication with passageway 102 is a passageway 103 in axially extending member 104. A distribution element 106 is formed with transversely extending passageways 107 which communicate fluid to an annular recessed area 108 and in turn to radial passageways 109. Hydraulic fluid then flows through the center 111 of transverse pin 112 and out the transverse passageways to the periphery 114 of the pin. Fluid at the periphery 114 of the pin is then able to flow down axially extending passageway 116 in piston member 117 to a cylinder 118 in base member 92 of the pivotal jaws. A second piston 119 is mounted for reciprocation in auxiliary cylinder 121 which is in fluid communication with primary cylinder 118. The end of piston 119 is coupled at 122 to tip member 94.

When the hydraulic fluid pressure is increased, the pressure in cylinder 118 and auxiliary cyclinder 121 increases so as to apply pressure to piston 117 and piston 119. Since piston 117 is pinned at pin 112 to body 93 of the jaw assembly, member 92 tends to rotate about pin 123 in a clockwise direction or toward the remaining jaw means 91. Similarly, the pressure on piston 119 tends to urge that piston to the right, causing pivoting of tip 94 about pin 96 in a clockwise direction or toward the remaining jaw means 91. When fluid is removed from circuit 98 and cylinders 118 and 121, jaw member 92 tends to be pulled down over piston 117 or pivoted in a counterclockwise direction away from the remaining jaw to open the jaw assembly. Piston 119 experiences a smilar tendency, but the shoulder 124 limits the counterclockwise pivoting so that both members 92 and 94 tend to pivot counterclockwise as a unit during opening of the jaws.

When a workpiece or object is placed between the jaws, base member 92 will tend to engage the workpiece first as pressure in cylinders 118 and 121 increases. The resistance from the workpiece, however, will soon stop closing of base member 92. If the workpiece or object does not engage tip 94, the pressure increase in cylinder 118 and auxiliary cylinder 121 will continue to displace piston 119, causing the tip to pivot independently of base member 92 about pin 96. This pivoting can be seen in phantom in connection with lower jaw 91 and results in the tip 94 pivoting down around the back side of the object until resistance is met. The claw structure is, therefore, substantially equivalent to a knuckle construction which allows the claw or jaw means to partially encircle round objects, such as pipes of the type often employed in underwater oil exploration and development.

It is an important feature of the jaw construction that the pressure applied by jaw members 92 and 94 is substantially equal so that uniform gripping of objects without pressure concentrations can be achieved. It will be noted that the area of end surface 126 of piston 117 is much greater than the area of surface 127 of piston 119. The gripping force induced by piston 119 in element 94 produces a reacton force about not only pivot pin 96, but also about pivot pin 123. Thus, the gripping force in tip element 94 subtracts from the gripping force in element 92. In order to have substantially the same gripping force along the jaws, piston 119 is about one-half the area of piston 126.

In order to insure that tip element 94 does not start to close or pivot about pin 96 before element 92 starts pivoting about pin 123, O-ring 131 preferably has greater friction in cylinder 121 than does O-ring 132 in cylinder 118.

As is shown in the drawing, it is preferable that both of jaw means 91 be formed with independently movable tips and movable base members which work off of a common hydraulic circuit 98. Such a common hydraulic circuit also has the advantage of causing the jaw means which is not engaged with the object to continue to close, while a jaw means which is engaging and being resisted by an object does not move. If, for example, the arm assembly is used to grip a pipe and the top jaw means 91 engages the top surface of the pipe first, the bottom jaw means 91 will not stop, but continues upwardly until it engages the bottom surface of the pipe. In both cases, the jaw tips knuckle around the back side of the pipe.

As will be appreciated, the jaw assembly of the present invention can be driven by a linear ball-screw type master piston and cylinder as above described with hydraulic circuit 98 being comprised of a closed, fixed volume hydraulic circuit coupled to slave piston and cylinder assemblies 117, 118, 119 and 121.

Rotation of terminal unit or jaws 68 is accomplished by hydraulic pressure in conduit 47d, which is coupled to cuff 71 and passageway 141 formed therein. Fluid is discharged from passageway 141 into space 142 between cuff or collar portion 143 and cylinder defining member 144. Mounted about the periphery of collar portion 143 is O-ring 146 which seals space 142 to permit pressurizing of the same with hydraulic fluid. Also fixedly threaded into collar or cuff 71 is member 104 which is formed with a helical path of recess 147.

The assembly body 93 is mounted to a nut or follower member 148 which carries ball bearings 149 to provide, with helically threaded element 104, a screw-ball assembly similar to that shown in FIG. 1. As pressure builds in space or cylinder 142, the nut or follower 148 rotates about screw element 104 to cause rotation of the claw or terminal device. Withdrawing fluid from space 142 produces rotation in an opposite direction, since the back side of collar portion 142 is subject to the ambient pressure. Rotation is limited by shoulder 151 in one direction and by collar portion 142 in the opposite direction.

Figure 2:
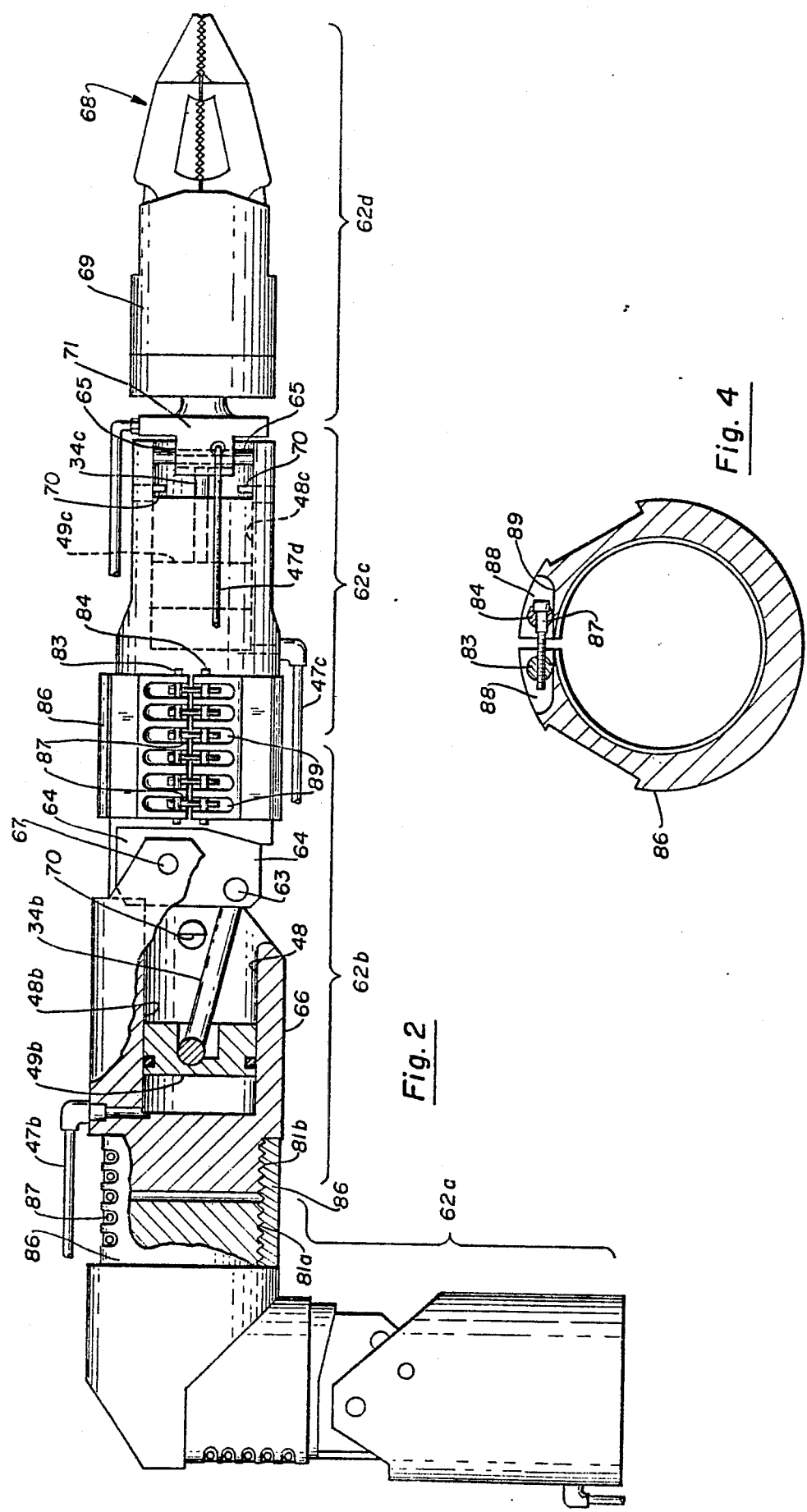
FIG. 2 is a side-elevational view of a manipulator arm constructed in accordance with the present invention.

Although not shown in FIG. 2, the master cylinders for the various modules and terminal unit 68 are preferably located proximate the base of manipulator assembly, and as indicated above they are each exposed to the same ambient pressure as are the slave pistons.

What is claimed is:

1. A jaw assembly for a remote manipulator apparatus including a pair of opposed jaw means each formed with a gripping surface for gripping an object therebetween, at least one of said jaw means being movably mounted with respect to the other of said jaw means, and drive means displacing the movable one of said jaw means to effect gripping and release of said object, wherein the improvement in said manipulator apparatus comprises:

said movable one of said jaw means being formed with a base member having a portion of said gripping surface thereon, said base member being displaceable by said drive means into gripping engagement with said object to grip said object between said base member and said other of said jaw means, and said movable one of said jaw means further having a tip member pivotally mounted to said base member and having a portion of said gripping surface thereon, said tip member being displaceable by said drive means into gripping engagement with said object to grip said object between said tip member and said other of said jaw means; and said drive means including three members, said three members being a fluid cylinder and two pistons mounted in said cylinder to contain a working fluid in said cylinder, at least two of said three members being movable with respect to a remaining member upon pressurizing said working fluid in said cylinder, and one of the two movable members being connected to and pivotally displacing said tip member with respect to said base member and said other of said jaw means until the portion of said gripping surface on said tip member engages said object, and the other of the two movable members being connected to and pivotally displacing said base member toward said other of said jaw means until the portion of said gripping surface on said base member engages said object.

2. The jaw assembly as defined in claim 1 wherein, both said jaw means are mounted for movement toward each other and coupled to said drive menas, and said remainder of said jaw means is formed substantially identically to the first named of said jaw means.

3. A jaw assembly as defined in claim 1 wherein, said jaw assembly includes a body portion, a first of said pistons is coupled at one end to said body portion and extends at an opposite end into said cylinder, said cylinder is carried by said base portion and is movable with respect to said first of said pistons, and a second of said pistons is coupled at one end to said tip portion and extends at an opposite end into said cylinder, and said second of said pistons is movable with respect to said cylinder.

4. A jaw assembly as defined in claim 3 is wherein, said cylinder is formed with a first end slidably receiving said first of said pistons therein and a second end slidably receiving a second of said pistons therein, said second end and said second of said pistons having an area less than the area of said first end and said first of said pistons.

5. A jaw assembly as defined in claim 4 wherein, said second end has an area which is about one-half the area of said first end.

* * * * *